Feb. 17, 1931.  J. PESOLA  1,793,008
MECHANICAL SAW
Filed Aug. 6, 1929   2 Sheets-Sheet 1

Inventor
J. Pesola
By Clarence A. O'Brien
Attorney

Feb. 17, 1931. J. PESOLA 1,793,008
MECHANICAL SAW
Filed Aug. 6, 1929 2 Sheets-Sheet 2

Inventor
J. Pesola
By Clarence A. O'Brien
Attorney

Patented Feb. 17, 1931

1,793,008

UNITED STATES PATENT OFFICE

JOE PESOLA, OF EUREKA, CALIFORNIA

MECHANICAL SAW

Application filed August 6, 1929. Serial No. 383,900.

This invention relates to an improved mechanical movement or power device susceptible of general application of the industrial art, which is substantially adapted to be embodied in a novel drag saw construction.

In accordance with the present construction, I have found it expedient to employ a rotary driving pinion which is cooperable with an endless power transmission rack, the rack being associated with the pinion through the medium of novel means which cause the rack to travel through a complete revolution of circle eccentrically around the pinion. The saw blade is attached to the rack, whereby it is reciprocated back and forth through the work and at the same time moves vertically in a direction at right angles to the line of reciprocation at the end of the opposite stroke, whereby to provide a transmission device simulating manual manipulation in its action.

In carrying out the present invention I have evolved and produced a simple and inexpensive device characterized by the novel arrangement of details which cooperate intermittently in a structural sense to insure dependable and positive action and fulfill the requirements of an invention of this class in an efficient and satisfactory manner.

Other objects and advantages of the invention will become apparent during a study of the following description taken in connection with the accompanying drawings, wherein.

Figure 2:
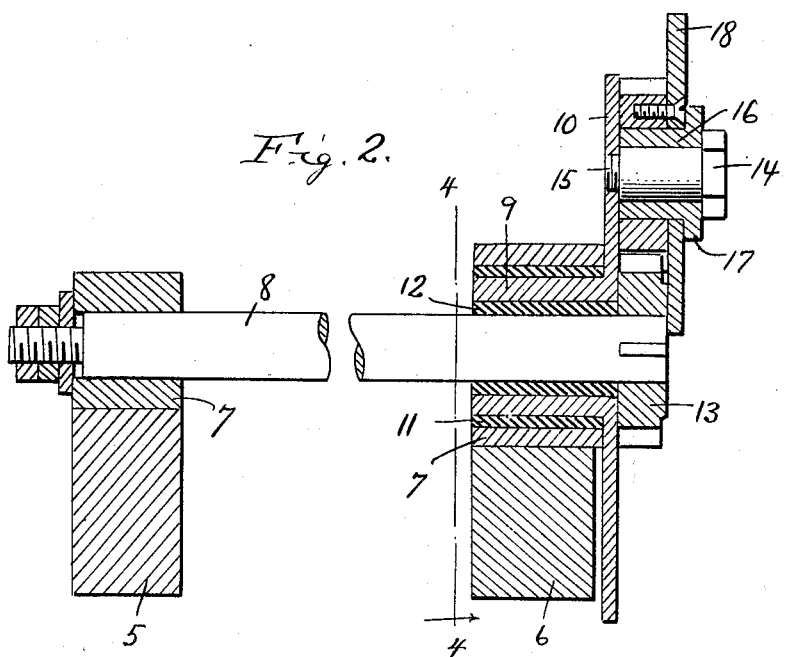
Figure 2 is a sectional view taken approximately upon the plane of line 2—2 of Figure 1.

Attention is first invited to Figure 2, wherein it will be observed that the supporting structure includes spaced parallel rails 5 and 6, the rails being each provided with suitable bearings 7—7 to accommodate the end portion of a shaft 8.

The shaft 8 may be driven from any suitable source of power not shown. Receivable within the bearing 7 on the rail 6 is the collar or hub 9 of a disc 10.

As before intimated the hub 9 is of course adapted for rotation with the disc 10 but is free to turn around that end of the shaft 8 within said bearing 7 on the rail 6. A bushing 11 of babbitt or like material is disposed circumjacent the collar 9 within the bearing 7 and this Babbitt bushing 11 constitutes a brake lining so as to control the rotary movement of the disc 10.

A bushing 12 is attached to the inner face of the collar 9 and is disposed circumjacent the adjacent end of the shaft 8.

It has been found in actual practice, that the outer face of the hub 9 of the disc 10 furnishes the desired amount of friction so as to cooperate with the babbitt 11 for obtaining the desired amount of braking power.

That end of the shaft 8 that projects beyond the outer face of the disc 10 is provided with a driving pinion 13. A pin 14 has one end threaded into the disc 10 as at 15 and said pin 14 is eccentrically mounted on said disc. The pin 14 is provided with a sleeve bushing or bearing 16, having a retaining flange 17. The reference character 18 designates an elongated plate-like head having an elongated slot 19 slidably cooperable with the bushing 16. One side of this head is provided with an endless rack 20, surrounding the slot 19 and having its teeth arranged for cooperation with the teeth of the pinion 13. This rack is interposed between the disc 10 and head 18 and is relatively movable with respect to the disc 10. The blade of the saw is designated generally by 21. For the sake of clearness, the reference character 22 is employed to designate the lower bar and the reference character 23 the upper bar of the rack 20, said bars 22 and 23 extending in spaced parallelism while the numerals 24—24 represent the curved ends of the rack. Obviously, the flange 17 of the bushing 16 engaging the face of the plate 18 opposite to the rack 20 normally retains said rack in intermeshing relation with the pinion 13.

Figure 1:
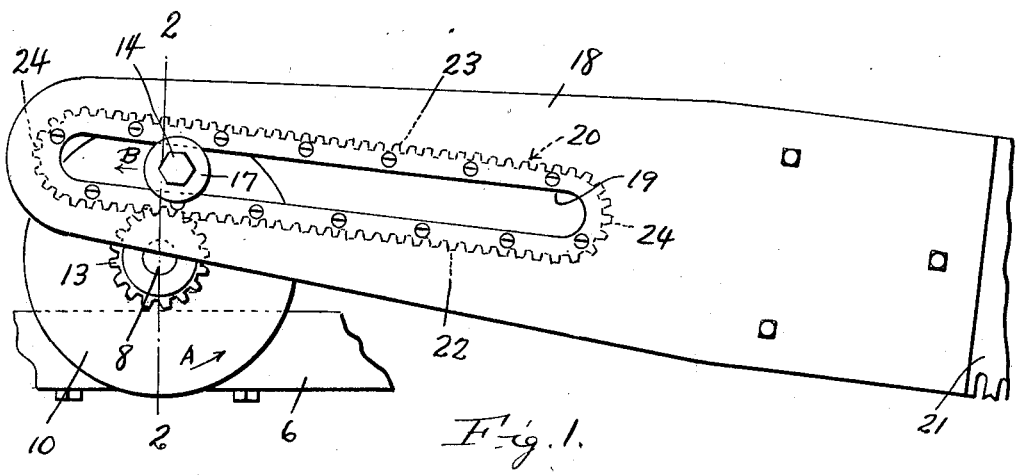
Figure 1 is a fragmentary side elevation of the principal details of the power transmission means showing the direction of movement of the saw at the beginning of one stroke.
Figure 3:
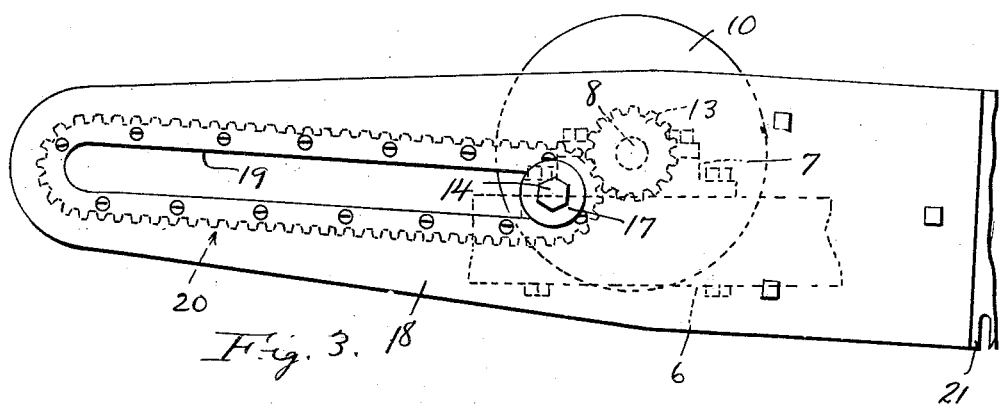
Figure 3 is a view similar to Figure 1 showing the position of the saw at the beginning of a reverse stroke.
Figure 4:
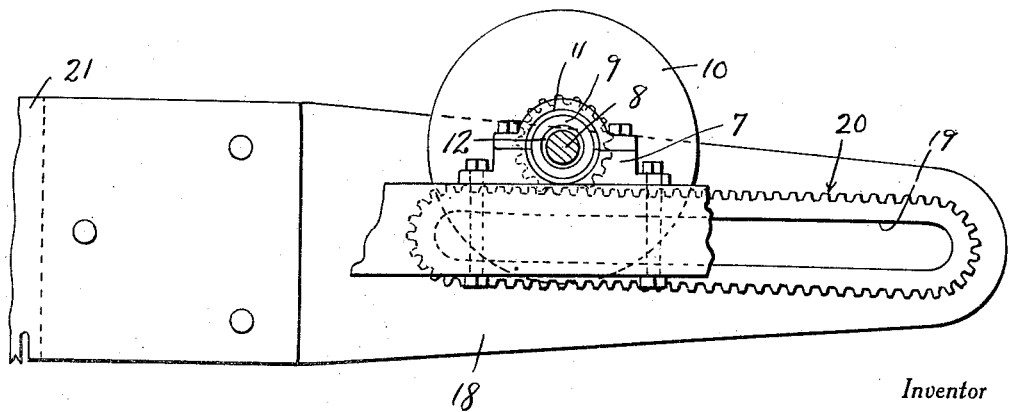
Figure 4 is a sectional view taken approximately upon the plane of line 4—4 of Figure 2.

In operation, and starting with Figure 1, it will be seen that the saw is reciprocated in the direction of the arrow B. The pinion turns in the direction of the arrow A. At this time, the pinion is in mesh with the teeth of the bar 22. During the initial movement of the saw in this reciprocatory manner the relatively movable disc 10 is temporarily stationary. When the right hand end of the slot 19 comes into contact with the sleeve 16, the disc 10 is shifted around a part turn, thus causing the parts to assume the relationship seen in Figure 3. This is the beginning of the return stroke of the saw. At this time, the pinion is in mesh with the end portion 24 of the rack.

It is then gradually fed around, bringing the teeth of the pinion in mesh with the upper bar 23 which has now become the lower bar. When the end of the last stroke is reached, the pinion meshes with the opposite end portion 24 of the rack, again shifting the disc 10 around a part turn.

It will thus be seen that the saw blade not only has a reciprocatory motion in a longitudinal direction, but has a rotary motion around the pinion, causing the end of the saw blade to move vertically to simulate a natural sawing action.

It is thought that by considering the description in connection with the drawings, a clear understanding of the construction, operation and features and advantages of the invention will be had. A more lengthy description thereof is therefore deemed unnecessary.

Minor changes in the shape, size and arrangement of details, coming within the field of the invention claimed may be resorted to in actual practice, if desired.

Having thus described my invention, what I wish to claim as new is:

1. In a device of the class described, a bearing, a shaft mounted for rotation in said bearing, a member rotatably mounted on said shaft, a pin eccentrically carried by said member, a pinion on said shaft for rotation therewith, an endless rack frame having exterior teeth meshing with said pinion, said pin projecting through said rack frame and engaging therewith for retaining said rack frame in operative position with respect to said pinion, a saw head rigidly secured to one side of said rack frame, and braking means cooperating with said member for retaining the latter in fixed position relative to said shaft and to cause said member to partially rotate intermittently and only when the end portions of said rack frame engage said pin.

2. In a device of the class described, a bearing, a shaft mounted for rotation in said bearing, a disc rotatably mounted on said shaft, a pin eccentrically carried by said member, a pinion on said shaft for rotation therewith, an endless rack frame having exterior teeth meshing with said pinion, said pin projecting through said rack frame and engaging therewith for retaining said rack in mesh with said pinion, a saw head rigidly secured to one side of said rack frame, and friction braking means cooperating with said disc for retaining said disc in fixed position relative to said shaft and to cause said disc to partially rotate only when one end of said rack frame forcibly engages said pin.

3. In a device of the class described, a bearing, a shaft mounted for rotation in said bearing, a member rotatably mounted on said shaft, a pin carried by said member and extending at right angles thereto, a pinion on said shaft for rotation therewith, an endless rack frame having exterior teeth meshing with said pinion, said pin projecting through said rack frame and engaging therewith for retaining said rack in engagement with said pinion, a head carrying a saw rigidly secured to said rack frame for imparting reciprocatory movement to the saw, and means cooperating with said member for rotating said member to a partial revolution at different periods for rocking the saw at the completion of movement of the saw in one direction.

4. In a saw of the class described, a bearing, a bushing in said bearing, a power shaft mounted for rotation in said bushing, a disc, a hub integral with said disc and mounted on said shaft for rotation independently of said shaft, said hub being mounted between said shaft and said bushing for frictional engagement with said bushing for normally retaining said disc in fixed position relative to said shaft, a second bushing arranged within the confines of said hub on said shaft, a pin eccentrically mounted on said disc, a saw head, an endless rack frame rigidly secured to said saw head, said pin extending into said frame and bearing against the inner face of said frame, and means carried by said pin engaging said rack frame for movably retaining said pin in engagement with said rack frame, a pinion on said shaft for rotation therewith meshing with said rack frame for imparting reciprocatory movement to the saw, and for forcibly engaging the ends of the frame into engagement with the said pin at the completion of movement of the saw in one direction for rotating through a partial revolution for rocking said saw at said completion of movement.

In testimony whereof I affix my signature.

JOE PESOLA.